June 7, 1955 R. C. MOSES 2,710,310

VARIABLE LEVEL SYNCHRONIZING SIGNAL CLIPPER

Filed Nov. 20, 1948

INVENTOR.
Robert C. Moses
BY
[signature]
Attorney

United States Patent Office 2,710,310

Patented June 7, 1955

2,710,310

VARIABLE LEVEL SYNCHRONIZING SIGNAL CLIPPER

Robert C. Moses, Swampscott, Mass., assignor to Sylvania Electric Products Inc., a corporation of Massachusetts Application November 20, 1948, Serial No. 61,212

8 Claims. (Cl. 178—7.3)

The present invention relates to radio signaling, and is concerned with the separation of certain amplitude components from composite electrical waves. The invention has application to pulse communication, for example, where it may be desired to separate the pulses from accompanying noise of lower level, and it is particularly well suited to the separation of synchronizing pulses from composite control and image components in television signals.

Television signals include video components and synchronizing pulses, varying respectively on opposite sides of a "black" level. The synchronizing pulses control beam-scanning in the picture tube of the receiver in proper relation to scanning in the transmitter. According to one practice the video components are extracted in the receiver by referring the signal to a fixed-bias point so that only synchronizing pulses are transmitted. This had the disadvantage of allowing picture components to pass into the pulse channel, and of blanking much of the synchronizing pulses unintentionally, depending upon the average strength of the signal. According to another practice a bias is developed by the signal itself for fixing the separation level. While this improves over the fixed bias arrangement in the case of variable level signals, it is not wholly satisfactory because of the variation in picture composition which may shift the average signal level.

The present invention provides a novel amplitude separator which blanks a large portion of the signal below a first level, preferably determined by signal-developed bias, and further blanks a small portion of the remainder at a second level, with bias that is also preferably dynamically developed. This latter bias is referred not to the same base as that of the first separator, but to the separation level of the first separator. The resulting separation of pulses is achieved at a constant fraction of the signal excursion, and the circuit is stable without reliance on critical components. When applied to separation of synchronizing pulses the first bias level is in the region of "black"; and the second bias level crops out any signal components that may survive.

Separation of synchronizing pulses has heretofore been achieved by means of comparatively complex circuits. According to a further aspect of the invention a very great simplification of effective separation circuits is accomplished. The nature of the invention and further aspects and features of novelty will be better appreciated from the following detailed disclosure of a specific illustrative embodiment. In the drawings.

Figure 1:
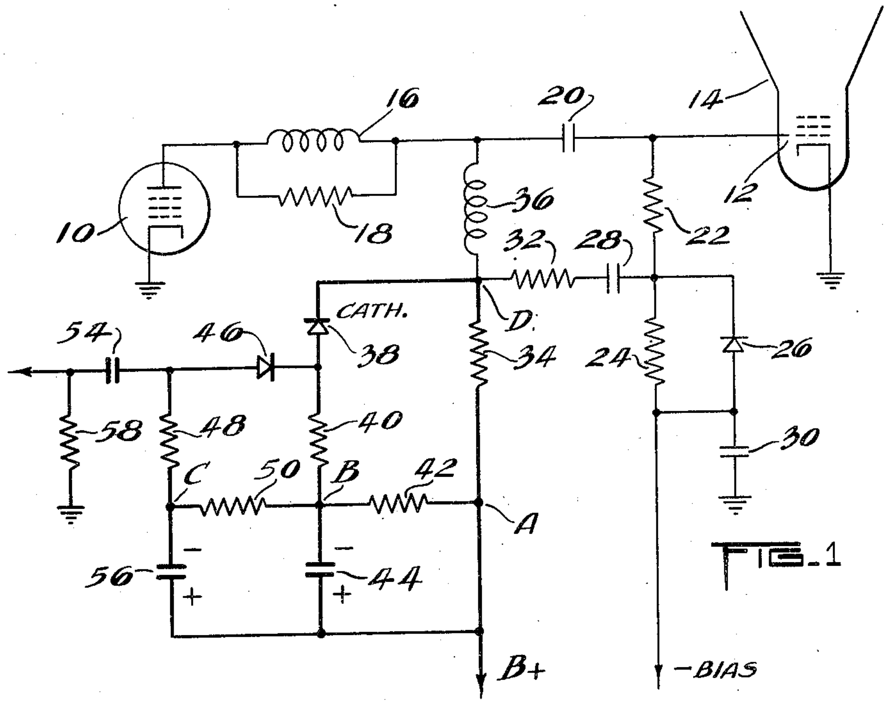
Fig. 1 is the wiring diagram of a portion of a television receiver utilizing an embodiment of the invention (in emphasized lines) for deriving synchronizing pulses.

In Fig. 1, final video amplifier tube 10 is shown with conventional circuits for coupling the composite signal to the intensity control grid 12 of picture tube 14. These connections include a parallel choke-and-resistor assembly 16, 18 and coupling condenser 20. Appropriate bias is applied to grid 12 through resistors 22 and 24 in series. This bias comprises a fixed negative potential and an added dynamic component provided by a D.-C. reinserter circuit including, in addition to resistor 24, diode 26, condensers 28 and 30 and resistor 32. The D.-C. reinserter provides assurance that the picture tube will not operate at a mean value of the signal passed by condenser 20, but that grid 12 shall operate in the cut-off region below the "black" level of the signal during synchronizing pulses, and is designed to provide the necessary grays and white at the cathode-ray screen in response to the video component of the signal despite variations in black-and-white composition of the picture. The output impedance of final amplifier 10 includes a plate resistor 34, and a choke coil 36 that assists in preserving high frequency video components at the grid of the picture tube.

Figure 2:
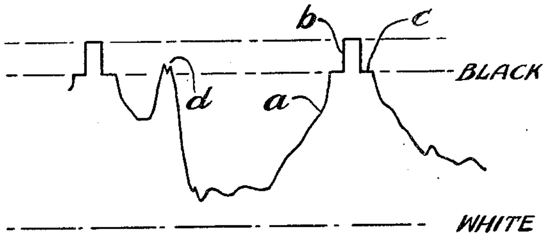
Fig. 2 illustrates a typical television signal from which the synchronizing pulses are to be separated in the circuit of Fig. 1.

The output signal of amplifier 10 is illustrated (inverted) in Fig. 2. This includes a video component *a* which varies between the black and the white levels and a synchronizing pulse *b* on a plateau *c* dividing component *a* from *b*. When the composite signal is applied to grid 12, portions *b* of the signal have no effect on the image because the electron beam of the cathode-ray tube is cut off at this time by voltage on the intensity-control grid of blacker-than-black negative intensity. However the composite signal cannot be used directly in controlling the synchronization of the scanning in the cathode-ray tube with the transmitter, but requires separation of the pulses *b* from the balance of the signal. This is achieved by the following simple, stable, and effective circuit which is energized by the combined direct-current and signal voltages developed across resistor 34. It will be appreciated that the static current flowing through tube 10 passes through resistor 34 and produces a direct-current voltage drop in addition to the signal voltage developed across resistor 34.

The composite signal including portions *a* and *b* is impressed on a series circuit including diode 38, which advantageously is in the form of a cats-whisker in point contact with a germanium crystal, connected in series with a first diode load resistor 40, and in turn, with a bias resistor 42 and shunt condenser 44. Condenser 44 charges rapidly during the intervals when diode 38 is conductive, and discharges gradually through resistor 42. This develops a bias voltage impressed on the diode through resistors 34 and 40. This dynamic bias is derived from signal energy, and varies with changes in peak (synchronizing pulse) amplitude of the signal. The dynamic bias is added to the direct current drop in resistor 34 and impressed on diode 38. The components are proportioned so that the diode is rendered nonconductive in the presence of image components *a* of the composite signal. The self-biasing circuit should have a time constant long in relation to the pulse period but short enough to respond to slow changes in signal strength. The direct current drop in resistor 34 is, by design, a small value in comparison to the bias developed by the resistor-and-condenser combination 42, 44.

Diode 38 passes the components *b* of the composite signal. It may pass the plateau portions *c* to some extent, and may additionally pass some small noise components *d* accompanying portions *a* and *c* of the television signal. The level at which the separation is effected depends to some extent on the amplitude of the signal emerging from amplifier 10, but the larger part of the total signal is blanked at the 75% level in the illustration. Condenser 44 cannot charge to a higher voltage than the peaks passed by diode 38, and in consequence this resistor-condenser bias circuit is self-adjusting in relation to the signal, an advantage over fixed-bias separation.

With this advantage there arises the possibility that the separation will not be effected with the desired precision and stability at the black level. A second diode 46 is provided, having a second diode load resistor 48 and a biasing resistor 50 and condenser 56 for applying bias to diode 46 dynamically, that is, varying in proportion to slow changes in signal level. Condenser 56 charges (as in the case of condenser 44) during conductive intervals of its series diode 46, and discharges through resistor 50 to apply a bias during the discharge intervals to diode 46 through resistors 40 and 48. This second self-biased diode circuit yields a pulse voltage across resistor 48 that is coupled through conventional condenser 54 and output load resistor 58 to the frequency-control portion of the generator of beam-deflection voltage that is to be synchronized. The second separation level blanks a small part of the signal passed by the first, high-level separator, and this is a fine cut above the first separation level when the signal as a whole is considered.

Figure 3:
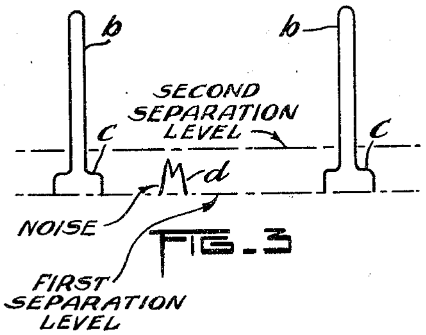
Fig. 3 is an enlarged diagram of signal separation at the first and the final level.

The bias developed in resistor 42 during the intervals when diode 38 is to be non-conductive is applied at point A which is a point of stable potential. The opposite terminal B of this bias supply will vary in potential with signal-amplitude variations where dynamic bias is used, such as is generated by resistance-capacitance circuits. The self-bias developed in resistor 50 and which is to blank diode 46 is referred to point B which varies with signal amplitude. In this way a bias reference is provided which enables reliable separation of the pulses at the second separation level (Fig. 3) where a signal dynamically biased diode would not be sufficiently reliable and stable for satisfactory pulse separation. It will be clear that, were the bias developed at point C referred to point A or some other point of stable potential, there would be only a cascade of self-biased diodes, each acting to contribute some averaging in the effect of the other. In the circuit shown, the first diode circuit extracts a large fraction of the total signal; the second diode circuit extracts a desired small fraction of the remaining signal that passes the first diode circuit.

The two diodes are connected in series between the signal input end D of resistor 34 and output coupling condenser 54; but the first one is so biased that it is blocked for the major portion of the signal excursion whereas the second diode is biased so that it is non-conductive during only a minor portion of the remainder of the signal that is passed by the first diode.

The operation of the circuit will be more fully appreciated from consideration of illustrative values of its components. Diodes 38 and 46 in this example are type 1N34 germanium crystals. Condenser 44 of 1.0 microfarad is charged during pulse peaks through resistor 40 of 5600 ohms and resistor 34 of 3300 ohms, condenser 44 later discharging through resistor 42 of 100,000 ohms. Condenser 56, also of 1.0 microfarad charges through resistor 48 of 6800 ohms and, in series with charged condenser 44, later discharges through resistor 50 of 220,000 ohms. It is the difference between the voltages to which condensers 44 and 56 are charged that develops a bias potential for diode 46 across resistor 50, and because of the long time constants of the two resistance-capacitance biasing circuits there is renewed charging only during the peaks of the pulses.

The dynamically developed bias in each of the two diodes is an advantage where some variation in signal amplitude and in signal form is expected. More broadly however the arrangement of the two-diode separating circuit, where the second is energized by the output of the first but has its bias referred to that of the first, achieves separation at a desired level within close limits despite some instability of values of the circuit components. Certain latitude of redesign, rearrangement and varied application of the foregoing will occur to those skilled in the art; wherefore the appended claims should be allowed such broad interpretation as is consistent with the spirit and scope of the invention.

What is claimed is:

1. A pulse separating circuit for a composite synchronizing-pulse and video signals comprising a pair of diodes connected in series between input and output circuits and polarized with a terminal of one polarity of one diode connected to a terminal of the opposite polarity of the other diode so as to be conductive during pulse portions of the signal, one terminal of a first direct-current-conductive load impedance connected to the junction of said diodes, a resistance-and-capacitance biasing circuit connected between the opposite terminal of said first load impedance and a point of stable potential, a second direct-current-conductive load impedance having one terminal connected at the output of the second of said series diodes, and a resistance-and-capacitance biasing circuit connected between the opposite terminal of said second load impedance and said opposite terminal of said first load impedance.

2. A synchronizing pulse separating circuit for composite synchronizing-pulse and video signals, comprising a succession of diodes each having a series circuit including a direct-current-conductive load impedance and a resistance-and-capacitance biasing circuit, the series circuit of the first diode having one terminal connected to a point of stable potential and being proportioned to develop a bias approximately sufficient to blank out the video component of the signal and to develop a remainder signal voltage across its load impedance, and the series circuit of the succeeding diode having a voltage reference connection to the biasing circuit of the first diode, the second biasing circuit being proportioned to blank only a small portion of the remainder signal voltage and to develop a pulse potential across its load resistor, the succession of diodes having a terminal of one polarity of one diode connected to a terminal of the opposite polarity of the other diode.

3. A signal separating circuit for deriving peaks of composite input signals comprising a succession of diodes each of which has a respective resistance-and-capacitance biasing circuit in series with a respective direct-current-conductive load impedance, the input diode developing a pulse potential across its load impedance and developing a biasing potential representative of the composite input signal across its biasing circuit, the succeeding diode, load impedance, and biasing circuit being connected to the terminals of the first load impedance so that the first biasing circuit will furnish a variable reference for the biasing circuit of the succeeding diode in dependence on slow signal changes said diodes being connected in series between a composite signal input point and a pulse signal output point, and said diodes having a terminal of one polarity of one diode connected to a terminal of the opposite polarity of the other diode.

4. A pulse separating circuit comprising a first diode connected in series with a direct-current-conductive load impedance and with a self-biasing circuit, said biasing circuit being connected at one terminal to a point of stable potential, and a second separating circuit including a diode, a second direct-current-conductive load impedance, and a self-biasing circuit connected in series to said first load impedance and to the terminal of the biasing circuit of the first diode opposite said point of stable potential, said diodes having a terminal of one polarity of one diode connected to a terminal of the opposite polarity of the other diode.

5. A pulse separating circuit comprising a diode, a first direct-current-conductive load impedance, and a source of bias potential connected in series to the terminals of a signal input circuit, and a second series circuit including a diode, a second direct-current-conductive load impedance, and a self-biasing circuit connected to the terminals of the first load impedance the output signal being available at said second load impedance, said diodes having a terminal of one polarity of one diode connected to the terminal of the opposite polarity of the other diode.

6. A pulse separating circuit including a first diode and a second diode connected in series between an input point and an output point in the order named and polarized to be simultaneously conductive, a load resistor having a first terminal connected to the junction of said diodes, a second load resistor having a terminal connected to the output terminal of said second diode, and a pair of resistance-capacitance self-biasing circuits for said diodes connected in series between a point of stable potential and the second terminal of said second load resistor, the second terminal of the first mentioned load resistor being connected to the junction of said self-biasing circuits.

7. A circuit for separating synchronizing pulses from composite signals having video and pulse portions, including a first series circuit having a first diode, a first resistor and a first resistance-capacitance circuit connected in series between a signal input point and a point of stable potential, and being proportioned to block most of the video signal portion, and a second series circuit including a diode, a load resistor and a resistance-capacitance circuit connected at one end to the junction of said first load resistor and said first diode, and said second series circuit being connected at its other end to said first self-biasing circuit and being proportioned to block a small part of the signal transmitted by the first series circuit said diodes being connected in series between the signal input and output points, and having a terminal of one polarity of one of said diodes connected to a terminal of the opposite polarity of the other of said diodes and being polarized to be simultaneously conductive during application of synchronizing pulse portions of the composite input signals.

8. A pulse separating circuit, including signal input terminals, signal output terminals, a pair of diodes connected in series between one of said input terminals and one of said output terminals and polarized to be simultaneously conducting, an output load resistor having a terminal connected to said one output terminal, a pair of biasing resistors connected in series between the opposite terminal of said output load resistor and to the remaining one of said pair of input terminals, another load resistor connected between the junction of said series diodes and the junction of said biasing resistors, and a pair of condensers connected at one terminal of each to said remaining input terminal and connected at the opposite terminal of each respectively to the junction of said biasing resistors and to the junction of said output load resistor with said series biasing resistors.

References Cited in the file of this patent

UNITED STATES PATENTS

| | | |
|---|---|---|
| 2,227,906 | Kellog | Jan. 7, 1941 |
| 2,239,906 | Tuxen | Apr. 29, 1941 |
| 2,240,490 | Cawein | May 6, 1941 |
| 2,260,963 | Wilder | Oct. 28, 1941 |
| 2,299,944 | Wendt | Oct. 27, 1942 |
| 2,299,945 | Wendt | Oct. 27, 1942 |
| 2,411,695 | Rado | Nov. 26, 1946 |
| 2,422,976 | Nicholson | June 24, 1947 |
| 2,424,349 | Cawein | July 22, 1947 |
| 2,493,353 | Kuperus | Jan. 3, 1950 |
| 2,512,637 | Frazier | June 27, 1950 |
| 2,566,832 | Grundmann | Sept. 4, 1951 |

FOREIGN PATENTS

| | | |
|---|---|---|
| 198,562 | Switzerland | June 30, 1938 |
| 497,371 | Great Britain | Dec. 19, 1938 |